United States Patent
Sherstyuk et al.

(10) Patent No.: US 10,193,369 B2
(45) Date of Patent: Jan. 29, 2019

(54) ACTIVE BATTERY MANAGEMENT SYSTEM

(71) Applicant: GBATTERIES ENERGY CANADA INC., Ottawa (CA)

(72) Inventors: Mykola Sherstyuk, Ottawa (CA); Oleksandr Tkachenko, Ottawa (CA)

(73) Assignee: GBATTERIES ENERGY CANADA INC., Ottawa (CA)

( * ) Notice: Subject to any disclaimer, the term of this patent is extended or adjusted under 35 U.S.C. 154(b) by 0 days.

(21) Appl. No.: 15/861,593

(22) Filed: Jan. 3, 2018

(65) Prior Publication Data

US 2018/0191187 A1    Jul. 5, 2018

Related U.S. Application Data

(60) Provisional application No. 62/442,926, filed on Jan. 5, 2017.

(51) Int. Cl.
| | |
|---|---|
| *H02J 7/00* | (2006.01) |
| *H01M 10/46* | (2006.01) |
| *H01M 10/44* | (2006.01) |
| *H01M 10/42* | (2006.01) |

(52) U.S. Cl.
CPC ......... *H02J 7/0083* (2013.01); *H01M 10/425* (2013.01); *H01M 10/44* (2013.01); *H01M 10/46* (2013.01); *H02J 7/0021* (2013.01); *H02J 7/0042* (2013.01); *H01M 2010/4271* (2013.01)

(58) Field of Classification Search
CPC ..... H02J 7/0083; H01M 10/425; H01M 10/44
USPC ................................ 320/112, 151, 156, 161
See application file for complete search history.

(56) References Cited

U.S. PATENT DOCUMENTS

| | | |
|---|---|---|
| 5,296,797 A | 3/1994 | Bartlett |
| 6,181,107 B1 | 1/2001 | Hirose |
| 6,229,287 B1 | 5/2001 | Ferris et al. |

(Continued)

FOREIGN PATENT DOCUMENTS

| | | |
|---|---|---|
| KR | 10-2004-0080907 A1 | 9/2004 |
| WO | 98/52270 A1 | 11/1998 |

(Continued)

OTHER PUBLICATIONS

International Search Report and Written Opinion for PCT Application No. PCT/CA2018/050007 dated Apr. 3, 2018.

(Continued)

*Primary Examiner* — Drew A Dunn
*Assistant Examiner* — Harry O'Neill-Becerril
(74) *Attorney, Agent, or Firm* — Schott, P.C.

(57) ABSTRACT

A method for charging a battery cell includes first transferring of energy from a power source to a plurality of capacitive regions in the battery cell followed by transferring of charge stored in the plurality of capacitive regions of the battery cell into at least an electrolytic mixture that comprises the battery cell and electrodes immersed in the electrolyte mixture. The capacitive regions in the battery cell comprise capacitive double layers between the electrolyte mixture and particles of active material that comprise the battery cell. The transferring of energy from the power source to the capacitive regions occurs for a first duration of time sufficient to substantially fully charge the capacitive regions.

13 Claims, 8 Drawing Sheets

(56) References Cited

U.S. PATENT DOCUMENTS

| | | | |
|---|---|---|---|
| 6,388,447 B1* | 5/2002 | Hall | H02J 7/0047 |
| | | | 324/426 |
| 6,841,974 B2 | 1/2005 | Dykeman | |
| 7,227,336 B1 | 6/2007 | van Schalkwijk et al. | |
| 7,622,898 B2 | 11/2009 | Shimizu et al. | |
| 10,069,313 B2 | 9/2018 | Tkachenko et al. | |
| 2014/0159668 A1* | 6/2014 | Whitacre | H01G 11/50 |
| | | | 320/130 |
| 2014/0266068 A1 | 9/2014 | O'Brien et al. | |
| 2014/0375275 A1* | 12/2014 | Hung | B60L 3/003 |
| | | | 320/139 |
| 2016/0116548 A1* | 4/2016 | Ghantous | G01B 7/22 |
| | | | 702/63 |
| 2017/0005497 A1 | 1/2017 | Sherstyuk et al. | |
| 2018/0013306 A1 | 1/2018 | Tkachenko et al. | |

FOREIGN PATENT DOCUMENTS

| | | |
|---|---|---|
| WO | 2018/010019 A1 | 1/2018 |
| WO | 2018/126320 A1 | 7/2018 |

OTHER PUBLICATIONS

International Search Report and Written Opinion for PCT Application No. PCT/CA2017/050833 dated Sep. 29, 2017.

\* cited by examiner battery cell (discharging)

battery cell (charging)

ACTIVE BATTERY MANAGEMENT SYSTEM

CROSS REFERENCE TO RELATED APPLICATIONS APPLICATION

Pursuant to 35 U.S.C. § 119(e), this application is entitled to and claims the benefit of the filing date of U.S. Application No. 62/442,926, filed on Jan. 5, 2017, the content of which is incorporated herein by reference in its entirety for all purposes.

BACKGROUND

Advances in battery technology have not kept up with market demand. There is a need to improve the performance of battery systems, both in terms of charge storage capacity as well as in terms of extending its operational lifetime (in number of years and/or charge/discharge cycles).

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1A:
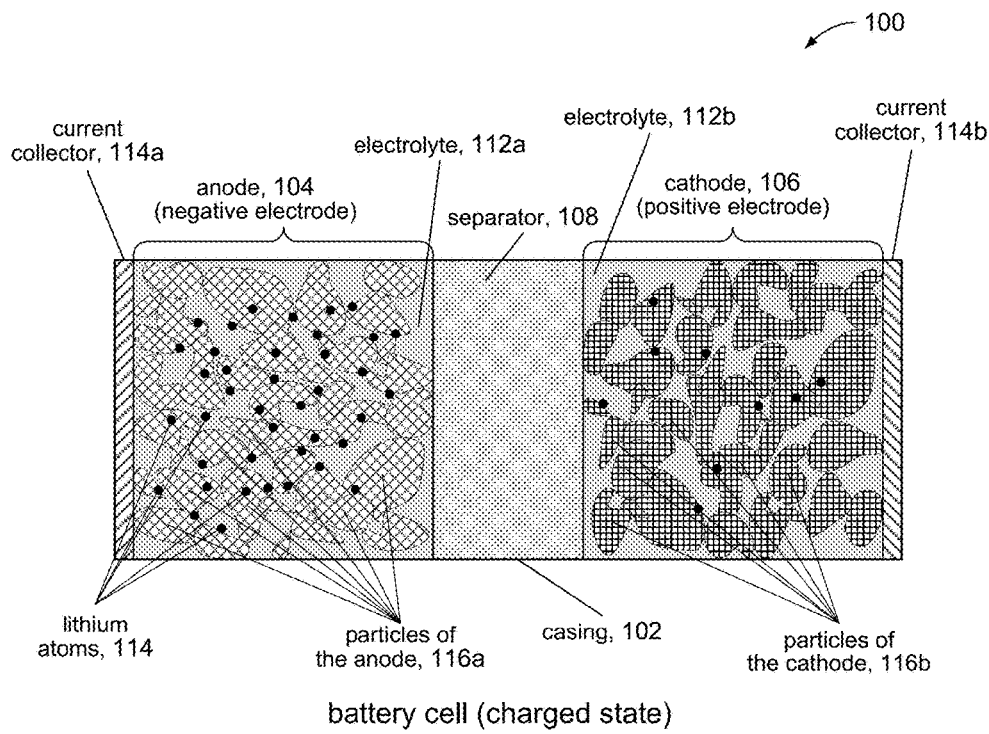
FIG. 1A is a schematic representation of a battery cell in a charged state.

FIG. 1A shows a simplified schematic representation of a battery cell 100, and in particular a lithium-ion battery cell. A "battery" or battery pack may comprise several battery cells 100. A battery cell 100 typically includes a casing 102 to hold the components the of the battery cell. The battery cell 100 may include an anode (negative electrode) 104 immersed in a suitable electrolyte 112a. The anode 104 may comprise any suitable compound such as porous carbon particles; e.g. graphite particles arranged into sheets. The battery cell 100 may further include a cathode 106 immersed in an electrolyte 112b. The cathode 106 may comprise any suitable metal oxide compound such as cobalt-oxide ($CoO_2$) particles 116a. The battery cell 100 shown in FIG. 1A represents an example of a charged battery cell showing the intercalation of lithium ions 114 with the carbon particles 116a that comprise the anode 104. The figure shows that in the charged state, some lithium ions remain 114 intercalated with the cathode 106.

Figure 1B:
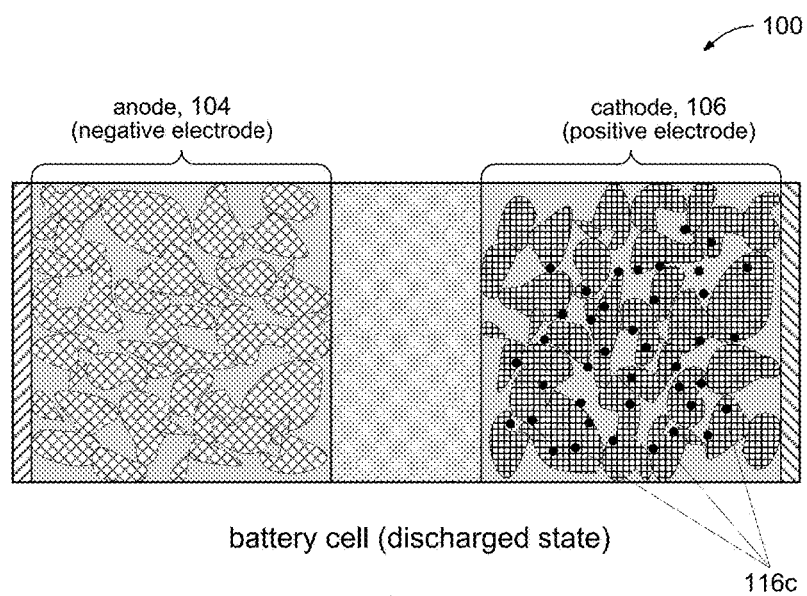
FIG. 1B is a schematic representation of a battery cell in a discharged state.

FIG. 1B represents an example of a discharged battery cell 100 in which the lithium ions 114 have migrated from the anode 104 to the cathode 106, and have combined with the metallic oxide particles 116b of the cathode 106 to form lithium-metal oxide particles 116c; for example, $LiCoO2$.

Figure 2A:
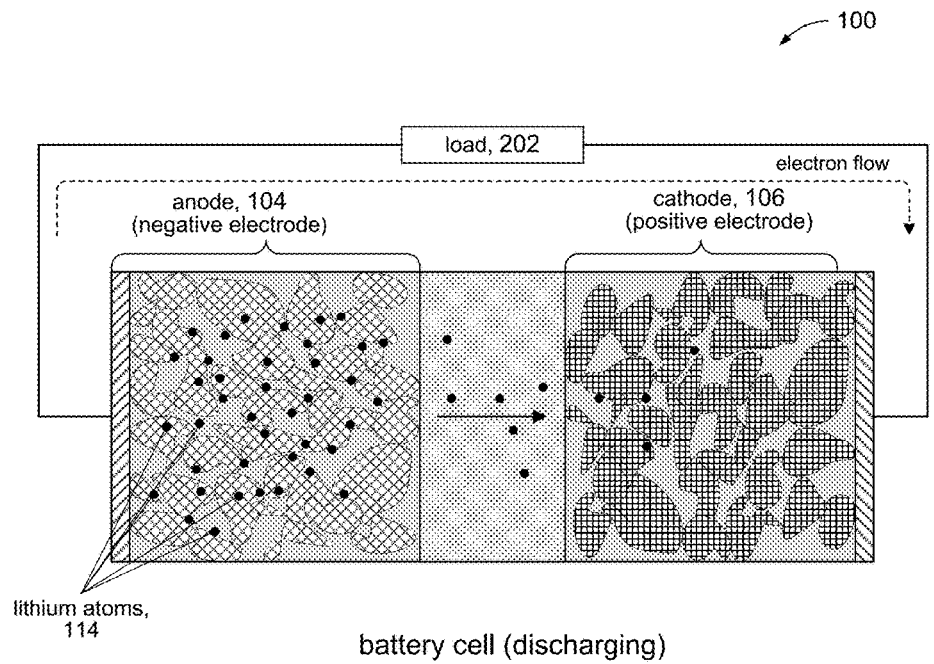
FIG. 2A is a schematic representation of a battery cell while discharging.

FIG. 2A represents a discharge process in a battery cell 100; for example, when the battery cell 100 is connected across a load 202. During discharging, ions (e.g., lithium ions) flow through the electrolyte from the negative electrode to the positive electrode. Electrons flow from the negative electrode to the positive electrode through the load. The lithium ions and electrons combine at the positive electrode. When no more lithium ions will flow, the battery is deemed to be discharged.

Figure 2B:
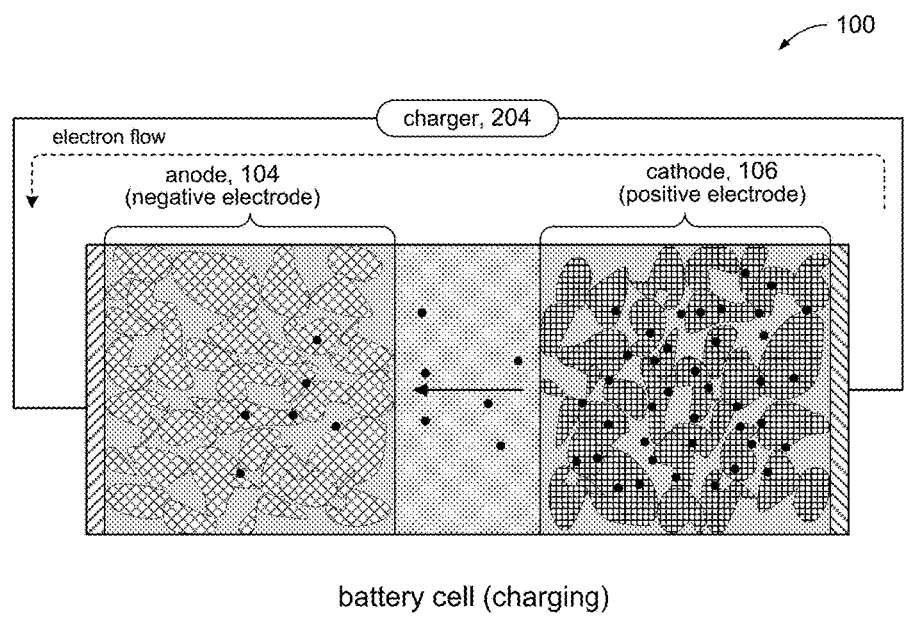
FIG. 2B is a schematic representation of a battery cell while charging.

FIG. 2B represents a charge process. During charging, the lithium ions flow from the positive electrode to the negative electrode through the electrolyte. Electrons flow through the external charger 204 in the direction from the positive electrode to the negative electrode. The electrons and lithium ions combine at the negative electrode and deposit there. When no more lithium ions will flow, the battery is deemed to be charged and ready to use.

It is generally understood that a battery cell includes capacitive regions within the battery cell. These capacitive regions are typically represented as battery cell equivalent circuit models. For example, some battery cell equivalent circuit models include a double layer capacitance that models the net effect of charge build up in the electrolyte of a battery cell at the surfaces of the battery electrodes of the battery cell. Some battery cell equivalent circuit models include an equivalent capacitance to represent the transient response of the battery cell during charging and discharging. Capacitive regions may be represented as a pseudo capacitance formed by a relationship between voltage applied to the battery cell and its State Of Charge (SOC), and so on. The combined capacitance of these capacitive regions can be substantial.

Figure 3:
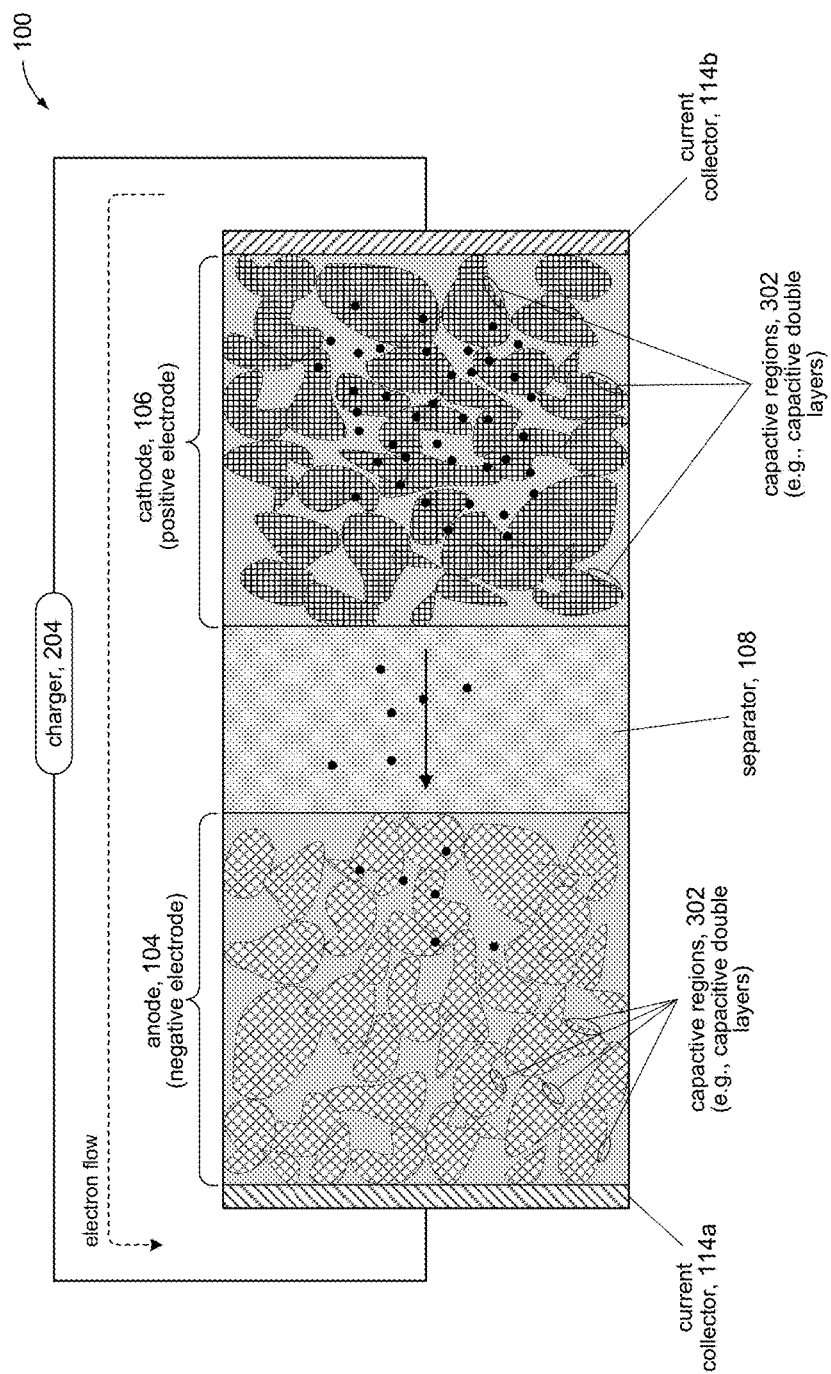
FIGS. 3 and 3A illustrate capacitive regions on a schematic representations of a battery cell.
Figure 3A:
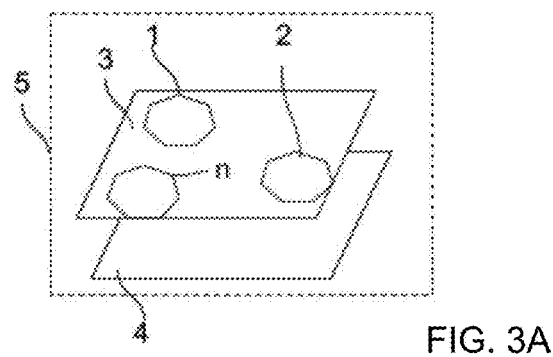

Referring to FIG. 3, capacitive regions 302 in a battery cell may be distributed throughout the internal volume of the battery cell 100. Capacitive regions 302 in the battery cell 100 may arise due to non-uniformities in the structures of the materials that form the of the battery electrodes 104, 106, the current collectors 114a, 114b, and the separator 108, as well as non-uniformities in the concentration distribution of the electrolyte within the battery cell 100. FIG. 3, for example, illustrates some examples of capacitive regions 302 in the negative and positive electrodes 104, 106 that include capacitive double layers between the electrolyte and particles of active material; e.g., carbon particles in the negative electrode, metal oxide particles in the positive electrode, etc. It will be understood that capacitive regions may occur elsewhere within the battery cell 100; for example, within the separator 108 (e.g., at the interfaces between the separator and electrolyte), within the positive electrode 106, and so on. FIG. 3A depicts a simplified schematic representation of a battery 5 with electrodes 3 (e.g., negative electrode) and 4 (e.g., positive electrode). Several, capacitive regions 1, 2, . . . n are represented as being distributed throughout electrode 3.

The capacitive regions may have different equivalent capacitances; for example, due to different sizes among the capacitive regions. Moreover, capacitive regions may have different equivalent capacitances despite having the same general area. This can arise, for example, due to non-uniformities in the materials that form the capacitive regions. In FIG. 3A, for example, the equivalent capacitance of a double layer at capacitive region 1 having a total area A in electrode 3 might be different from the equivalent capacitance of a double layer at capacitive region 2 of generally the same area. The equivalent capacitances of the capacitive regions are generally stable over time, but change over the lifetime of the battery cell.

During a charging process of the battery cell 100, it is believed that charge builds up in the capacitive regions (e.g., 302, FIG. 3) in the battery cell. The battery cell 100 comprises a number of mechanisms to dissipate (discharge) the charge energy accumulated (stored) in these capacitive regions. The dissipation mechanisms are substantially distributed inside the battery cell. It is believed that the dissipation mechanisms transfer energy stored in the capacitive regions to drive electrochemical reactions in the material of the negative electrode 104, the surrounding electrolyte, the lithium ions, and so on to redistribute the lithium ions in the negative electrode 104 to the positive electrode 106. The energy stored in the capacitive regions are thus transferred into ionic storage form, such as the redistribution of lithium ions from the negative terminal to the positive terminal.

Charge dissipation may occur at different rates for different capacitive regions in the battery cell, depending on the physical makeup of the capacitive regions and their locations inside the battery cell. The discharge rate may be defined and affected by local levels of charge accumulated in a given capacitive region, local properties of the dissipation mechanism in the area where the capacitive region occurs, and so on. Referring to FIG. 3A, for example, dissipation rates among the capacitive regions 1, 2 through n can be different from each other. Due to such differences, the dissipation time dt1 for the capacitive region 1 may be different from the dissipation time dt2 for the capacitive region 2 and from the dissipation time dtn for the capacitive region n. These dissipation mechanisms allow for the concurrent discharge of energy stored in capacitive regions 1, 2 . . . n. Thus, the longest of the dissipation times dt1, dt2, . . . dtn, should be sufficient time for the transfer of energy stored in the capacitive regions to dissipate into chemical form. It has been observed that dissipation times are normally in the range between 0.1 μs and 100 ms.

Figure 4:
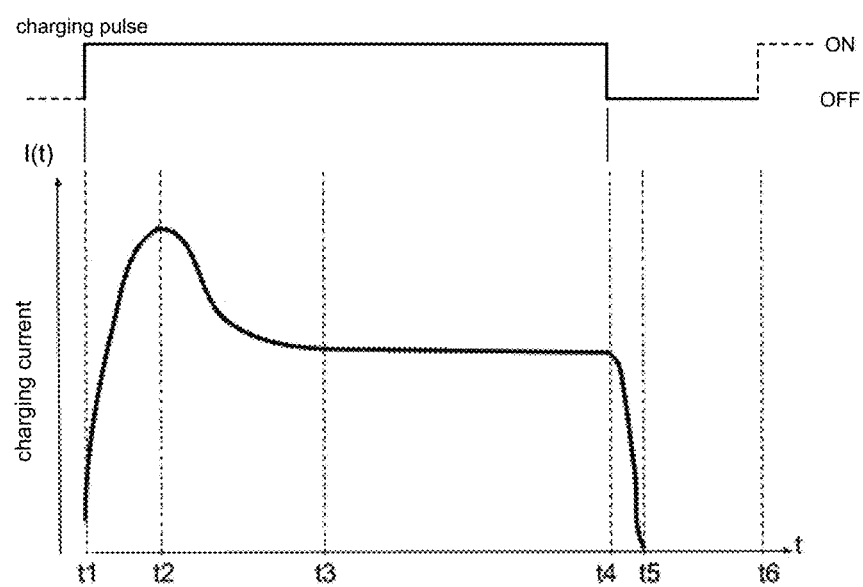
FIG. 4 shows a conventional charging current profile when charging a battery cell.

FIG. 4 shows a charging current profile, which represents charge current through a battery cell during battery charging expressed as a function of time, using a charging pulse. The charging pulse may control a charger switching mechanism (e.g., SW, FIG. 5A, which may be a switching FET for instance) to connect a charger 508 across the battery cell 100. The time period between t1 and t2 represents the turn-on time of the charger switching mechanism, showing a gradual rise in charging current as the charger switching mechanism transitions from the non-conducting state to the conducting state. The time period between t1 and t2 may also include other current limiting factors such as inductive components in the battery cell and charger circuitry. The time t2 may represent the time when the charger switching mechanism is deemed to be fully ON.

The time period between t2 and t3 in FIG. 4 represents the period of time during which the capacitive regions in the battery cell are getting charged. The time t3 may represent the time at which the capacitive regions in the battery cell are deemed to be at a state of maximum charge storage. Accordingly, the charging current during the time period between t3 and t4 represents charging current defined mostly by ionic transfer processes.

At time t4, the charger switching mechanism is turned OFF. The time period between t4 and t5 represents the turn-off time of the charger switching mechanism, showing a gradually decreasing flow of charging current as the charger switching mechanism transitions from the conducting state to the non-conducting state. The charging pulse repeats at time t6, after a delay period from time t5 to time t6.

The inventors have discovered that it can be beneficial to reduce the time period between t3 and t4 in each charge pulse. By reducing the time period between t3 and t4 sufficiently, all or almost all the energy from the charger (e.g., 508, FIG. 5A) can be used to charge the battery cell 100 via the charging/dissipation mechanism of the capacitive regions, described above. In particular, the inventors have discovered that if the charging current is applied to the battery cell just long enough to fully charge the capacitive regions in the battery cell and is then removed for a period of time, and the cycle repeated, the battery cell appears to be capable of faster overall charging without incurring increased temperatures in the battery cell, as compared to prior art charging methodologies. Moreover, the inventors have discovered that long term battery calendar life and charge cycle life can be improved; for example, less capacity fade over extended use has been observed.

Figure 5A:
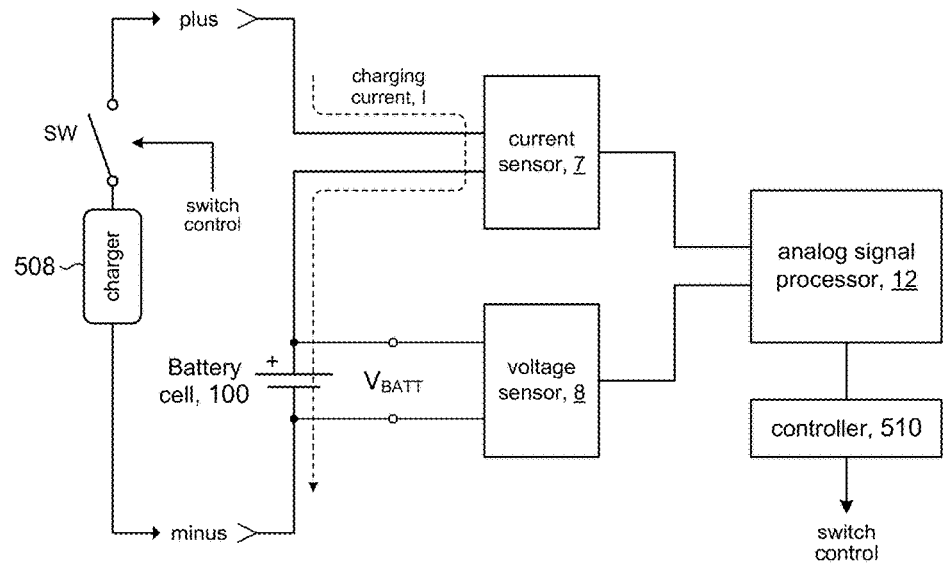
FIGS. 5A, 5B, and 6 show illustrative embodiments in accordance with the present disclosure.
Figure 5B:
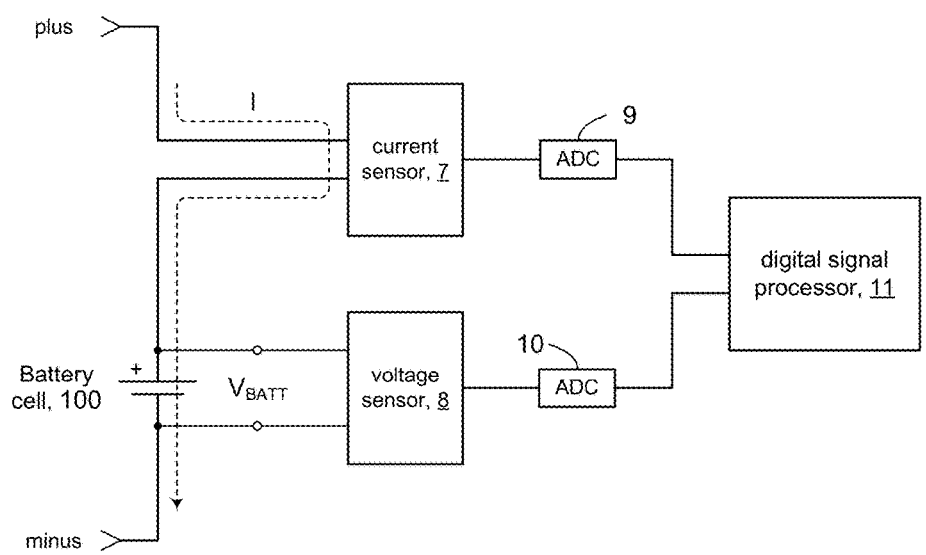

Referring now to FIGS. 5A and 5B, the discussion will turn to some embodiments in accordance with the present disclosure for detecting when the capacitive regions (e.g., FIG. 3) in the battery cell 100 are substantially fully charged. The basic charging configuration includes the battery cell 100 to be charged, a charger 508 (charging circuit), and the charger switching mechanism SW. Switching of the charger switching mechanism may be controlled via a switch control signal generated by a suitable controller 510.

In some embodiments, detecting that the capacitive regions in the battery cell 100 are substantially fully charged may be accomplished by measurement. In some embodiments, for example, detection may be achieved by measuring of a speed of change in the charge current I through the battery cell 100. FIG. 5A, for example, shows an embodiment comprising a current sensor 7 and a voltage sensor 8 (e.g., the voltage sensor 8 may be a voltage divider). The current sensor 7 may provide a measure of the charge current I (in the form of an analog signal) to an analog signal processor 12. The analog signal processor 12 may be configured to compute a first derivative of the charge current I as a function of time. In other embodiments, the analog signal processor 12 may be configured to compute a second derivative of the charge current I as a function of time.

FIG. 5B illustrates an embodiment that is digital. For example, the output of current sensor 7 may be converted to a digital quantity by an ADC 9. Similarly, the output of voltage sensor 8 may be converted to a digital quantity by an ADC 10. A digital signal processor 11 may be configured to compute a suitable metric indicative of the speed of change of the charge current I, such a first derivative or a second derivative of the charge current I as a function of time.

Figure 6:
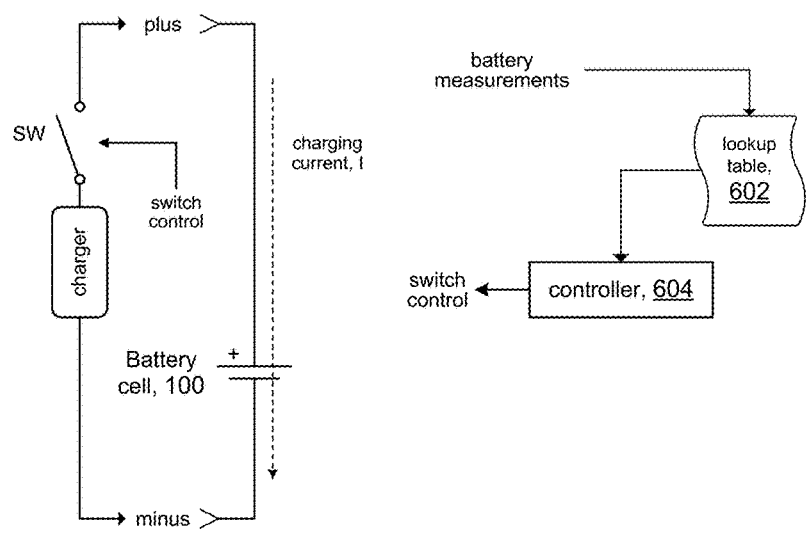

FIG. 6 illustrates another embodiment for detecting that the capacitive regions in the battery cell 100 are substantially fully charged. In some embodiments, for example, the detection may be accomplished by the use of a lookup table 602 that contains data that indicate when the battery cell capacitive regions are substantially charged. The data may comprise information relating the capacitive region charge time to factors such as the battery cell temperature, state of charge, cycle and calendar age, manufacturing batch, on the fly Electrochemical Impedance Spectroscopy (EIS) measurements, Battery Management System (BMS) diagnostic messages, and so on. The battery cell 100 may be characterized (e.g., during production) according to one or more of these metrics, which can then be stored in the lookup table. For example, samples of the battery cell 100 may be tested under various operating conditions (e.g., temperature, age, state of charge, etc.), and the times (charge times) to substantially fully charge the capacitive regions in the battery cells can be collected. The collection of charge times may be subjected to various computations (e.g., averaging, etc.) to produce charge time data for the various combinations of operating conditions. The charge time data and their associated operating conditions may be stored in the lookup table. In operation, one or more battery measurements (operating conditions) may be made and used to look up or otherwise determine a charge time from those measurements. A controller 604 may then operate the charge switching mechanism SW according to the charge times obtained from the lookup table 602.

Embodiments in accordance with the present disclosure include charging a battery cell through the improved pulsed charging process disclosed herein. Each charge pulse comprises two steps: (1) transferring energy from a power source to capacitive regions in the battery cell through an electric charging process during the ON time of the pulse; and (2) transferring energy from the capacitive regions of the battery cell into ionic storage form through the dissipation mechanisms during the OFF time of the pulse. In particular, the pulse is turned OFF at about the time the capacitive regions are fully charged in order to transfer energy stored in the capacitive regions into the ionic storage form.

Figure 7:
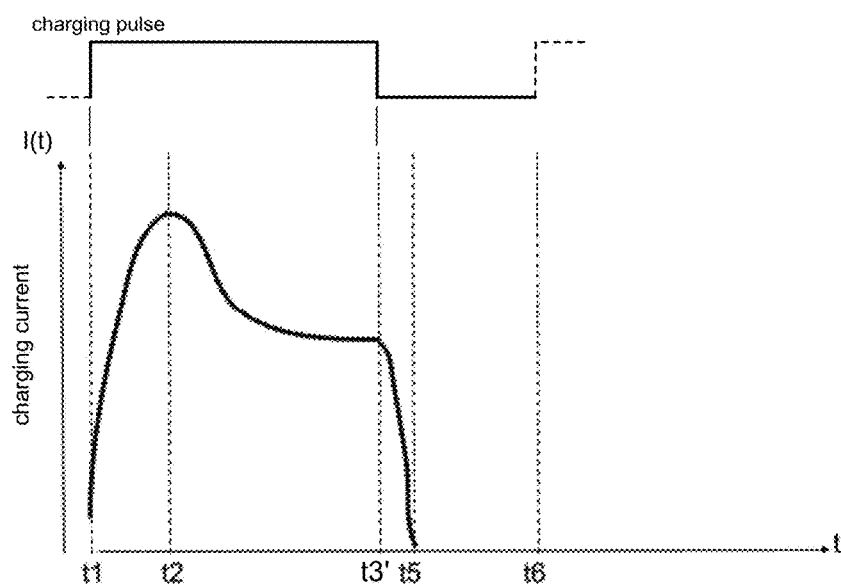
FIG. 7 shows a charging current profile[[s]] when charging a battery cell in accordance with the present disclosure.

FIG. 7 shows a charging current profile in accordance with a charge pulse of the present disclosure. Time period between t1 and t2 is when charger switching mechanism turns ON and/or the current is limited by inductive component of the battery cell and charger circuitry, as explained above. During this period the capacitive regions in the battery cell may become partially charged. The time period between t2 and t3' represents when the capacitive regions become substantially fully charged. Such time period could be shorter or equal to period between t2 and t3 shown in FIG. 4. This means that the capacitive regions could be fully or partially charged using charge pulses during a charging process in accordance with the present disclosure. As noted above, in some embodiments, a first derivative or a second derivative of the charge current I as a function of time can be computed to determine that the capacitive regions (e.g., 302, FIG. 3) in the battery cell 100 are substantially fully charged. With respect to the charging current profile shown in FIG. 7, as we approach time t3' from time t1, the first derivative of the profile would approach zero; and likewise the second derivative would also approach zero.

At time t3', the charge pulse is turned OFF. The time period between t3' and t5 represents the gradual decrease of the charge current I during the transition from the conducting (ON) state of the charge switching mechanism and the non-conducting (OFF) state.

The time period between t5 and t6 represents a pause between the end of previous charge pulse and beginning of the next charge pulse. In the charging process of the present disclosure, this period of time is sufficient to transfer energy from the capacitive regions of the battery cell into chemical form through the dissipation mechanisms. This time period could be shorter, equal to, or longer than the dissipation times dt1,dt2, dtn described above. The charge pulse includes pause time until the next pulse.

Figure 8:
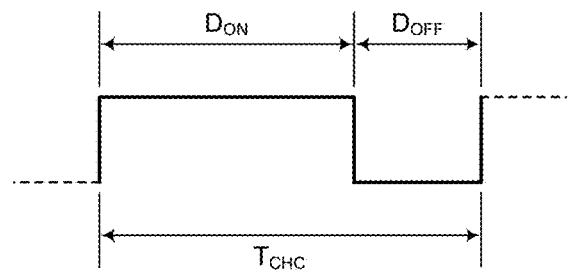
FIG. 8 shows a charging pulse in accordance with the present disclosure.

FIG. 8 illustrates various parameters of a charging pulse in accordance with the present disclosure. The charging pulse may have an ON time ($D_{ON}$) and an OFF time ($D_{OFF}$). The total time (pulse period) $T_{CHC}$ is equal to $D_{ON}+D_{OFF}$. The ON time $D_{ON}$ may be based on a derivative (e.g., first or second derivative) of the charge current expressed as a function of time, as explained above.

Figure 8A:
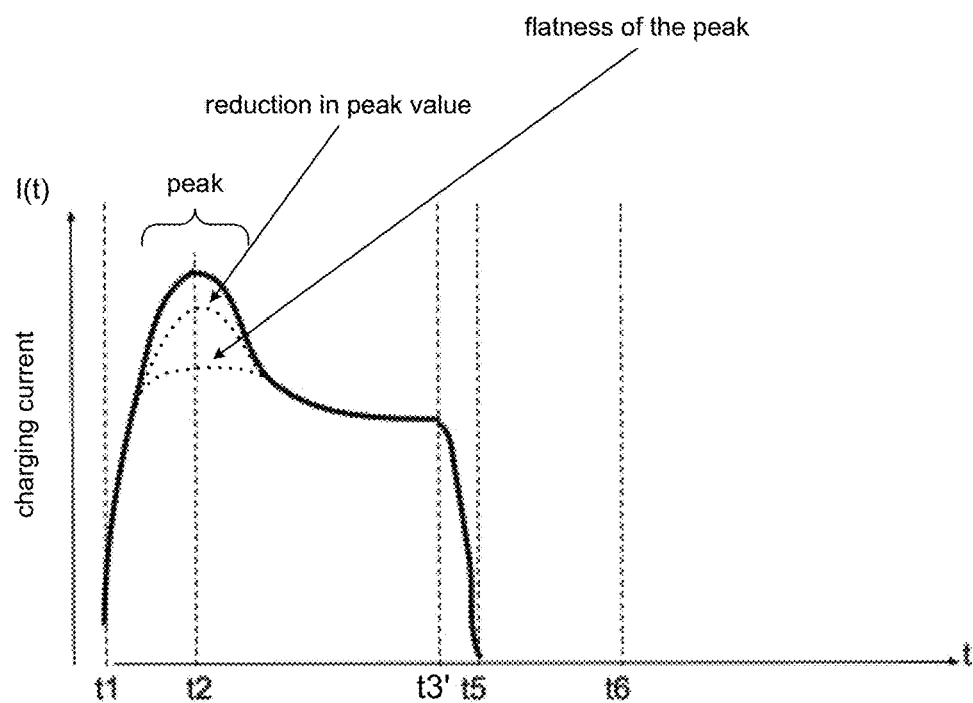
FIG. 8A shows a charging current profile when charging a battery cell in accordance with the present disclosure.

The OFF time $D_{OFF}$ may also be based on the charge current expressed as a function of time. As explained above, the OFF time of the charging pulse allows energy stored in the capacitive regions of the battery cell to dissipate so as to drive electrochemical reactions in the battery cell. If the OFF time is too short, then the energy stored in the capacitive regions may not have enough time to fully dissipate; i.e., the capacitive regions may not be fully discharged. The inventors have observed that when the OFF time is too short, this may manifest itself in a change in the charging current profile during the next charging pulse. Referring to FIG. 8A, for example, the peak of the charging current profile may vary if the OFF time of the previous charging pulse is too short. In some embodiments, the peak of the charging current profile for each charging pulse may be monitored. If a change in the peak is detected, the OFF time of the next charging pulse may be adjusted (e.g., increased). For example, the maximum value of the peak may be monitored. The "flatness" of the peak may be monitored; e.g., by measuring one or more slopes of the peak, and so on.

In some embodiments, $D_{ON}$ may be less than 50 µS. This may be sufficient time for the capacitive regions in the battery cell to become substantially fully charged. In some embodiments, each pulse may have the same values of $D_{ON}$ and $D_{OFF}$. In some embodiments, the $D_{ON}$ and $D_{OFF}$ may vary, but their sum ($D_{ON}+D_{OFF}$) may remain constant. In some embodiments, the sum ($D_{ON}+D_{OFF}$) may be in the range of 0.5 µS-100 µS.

In some embodiments, the pulse period $T_{CHC}$ may vary. In some embodiments, the pulse period $T_{CHC}$ may vary, but the duty cycle of the pulse ($D_{ON}/(D_{ON}+D_{OFF})$) may remain constant. In some embodiments, the pulse period $T_{CHC}$ may vary and the duty cycle of the pulse ($D_{ON}/(D_{ON}+D_{OFF})$) may vary.

The pulse period $T_{CHC}$ may vary between a maximum period and a minimum period. The pulse period $T_{CHC}$ may vary between a maximum period and a minimum period at a frequency (frequency modulation) between 0.1 Hz and 100 Hz. The pulse period $T_{CHC}$ may vary between a maximum period and a minimum period according to a waveform. In other words, the frequency of the pulse may be modulated (e.g., frequency modulated) according to a waveform.

In some embodiments, the magnitude of the charge current that flows through the battery cell may be constant from one pulse to the next.

Figure 9:
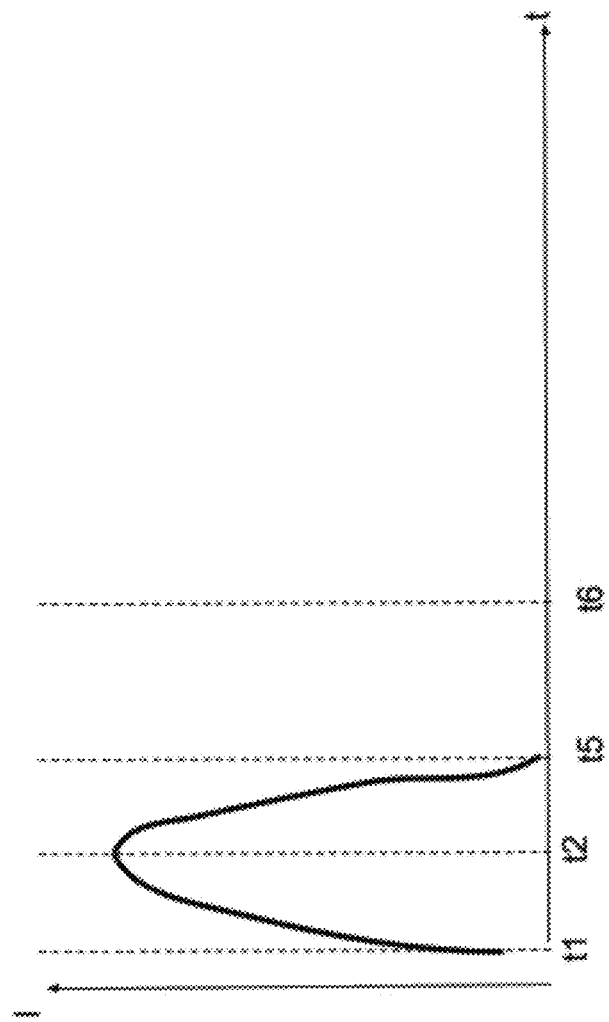
FIG. 9 shows a charging current profile when charging a battery cell in accordance with the present disclosure that involves high inductive component.

In some cases when battery cell has a significant inductive component, the inventors suggest that the time period between t2 and t3' may be omitted entirely. An example of such a battery cell could be a so called jelly roll 18650 packaged cell. FIG. 9 depicts the charge current during a charge pulse in accordance with the present disclosure applied to such battery cell.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method to charge a battery cell that is operatively coupled to a power source via a switching circuit, the method comprising:
    controlling the switching circuit to operate in a first switch position in which the power source is connected to the battery cell to transfer energy from the power source to a plurality of capacitive regions in the battery cell, wherein the connection of the power source to the battery cell results in flow of charging current through the battery cell;
    maintaining the first switch position for a first duration of time until a determination is made that a speed of change of the charging current through the battery cell is approaching zero, wherein the speed of change of the charging current approaching zero is indicative of the plurality of capacitive regions being fully charged;
    in response to determining that the speed of change of the charging current through the battery cell is approaching zero, controlling the switching circuit to operate in a second switch position, in which the power source is disconnected from the battery cell, for a second duration of time, resulting in transferring of charge stored in the plurality of capacitive regions of the battery cell by migration and/or diffusion of ionic charge within the battery cell; and
    controlling the switching circuit to alternate between the first switch position and the second switch position to charge the battery cell.

2. The method of claim 1, wherein the transferring of charge stored in the plurality of capacitive regions of the battery cell includes migration and/or diffusion of the ionic charge into at least an electrolytic mixture and electrodes immersed in an electrolyte, of the battery cell.

3. The method of claim 1, further comprising determining the speed of change of the charging current through the battery cell to determine that the plurality of capacitive regions are fully charged.

4. The method of claim 1, wherein the battery cell comprises an electrolytic mixture that further comprises a negative electrode of the battery cell immersed in an electrolyte.

5. The method of claim 1, wherein the battery cell comprises an electrolytic mixture that further comprises a positive electrode of the battery cell immersed in an electrolyte.

6. A battery charging circuit, comprising:
    an output port for a connection to a battery pack comprising at least one battery cell;
    a power source;
    a switching circuit, wherein the switching circuit is controllable to have a first switch position in which the power source is connected to the output port to provide electric current to the battery pack, and to have a second switch position in which the power source is disconnected from the output port; and
    a controller configured to:
        control the switching circuit to the first switch position to transfer energy from the power source to a plurality of capacitive regions in the battery cell;
        maintain the first switch position for a first duration of time until a determination is made that a speed of change of charging current through the battery cell is approaching zero, wherein the speed of change of the charging current approaching zero is indicative of the plurality of capacitive regions being fully charged;
        in response to a determination that the speed of change of the charging current through the battery cell is approaching zero, control the switching circuit to the second switch position for a second duration of time to allow transfer of charge stored in the plurality of capacitive regions of the battery cell into at least an electrolytic mixture of the battery cell; and
        control the switching circuit to alternate between the first switch position and the second switch position to charge the battery cell.

7. The battery charging circuit of claim 6, wherein the controller is configured to make measurements on the battery cell, wherein the measurements include at least a measurement of the speed of change of the charging current through the battery cell.

8. The battery charging circuit of claim 6, wherein a negative electrode and a positive electrode of the battery cell are immersed in the electrolytic mixture, and wherein the charge stored in the plurality of capacitive regions of the battery cell is further transferred to the negative and positive electrodes.

9. The battery charging circuit of claim 6, wherein the first duration of time is 50 μS or less.

10. The battery charging circuit of claim 6, wherein the controller is configured to control the switching circuit to alternate between the first switch position and the second switch position at a frequency that varies between 0.1 Hz and 100 Hz.

11. The battery charging circuit of claim 6, wherein the controller is configured to control the switching circuit by use of battery characterization data stored in a lookup table.

12. The battery charging circuit of claim 11, wherein the battery characterization data stored in the lookup table includes at least charge time data, corresponding to the battery pack, under various operating conditions.

13. A method to provide charge to a battery pack, the method comprising:
    connecting a source of electric current to the battery pack to provide a pulse of electric current through the battery pack;
    detecting a speed of change of the electric current through the battery pack;
    determining that the speed of change of the electric current through the battery pack is approaching zero;
    in response to determining that the speed of change of the electric current through the battery pack is approaching zero, disconnecting the source of electric current from the battery pack for a specific duration of time, $D_{OFF}$; and repeating the cycle of connecting, detecting, determining, and disconnecting to charge the battery pack.

* * * * *